(12) United States Patent
Miyasaka

(10) Patent No.: US 6,994,374 B2
(45) Date of Patent: Feb. 7, 2006

(54) FRONT BODY STRUCTURE FOR VEHICLE

(75) Inventor: Hiroyuki Miyasaka, Kanagawa-ken (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 80 days.

(21) Appl. No.: 10/284,168

(22) Filed: Oct. 31, 2002

(65) Prior Publication Data

US 2003/0090099 A1    May 15, 2003

(30) Foreign Application Priority Data

Nov. 14, 2001 (JP) .................. P 2001-349231

(51) Int. Cl.
*B62D 21/00* (2006.01)

(52) U.S. Cl. .................. 280/784; 296/187.09

(58) Field of Classification Search ................ 180/311; 280/777, 784; 296/187.03, 187.09, 187.1, 296/187.12; 293/132
See application file for complete search history.

(56) References Cited

U.S. PATENT DOCUMENTS

| | | | |
|---|---|---|---|
| 4,424,986 A * | 1/1984 | Mizuno et al. | 280/784 |
| 5,275,436 A * | 1/1994 | Pomero | 280/784 |
| 5,685,599 A * | 11/1997 | Kitagawa | 296/204 |
| 6,027,159 A * | 2/2000 | Baumann | 296/187.03 |
| 6,298,962 B1 | 10/2001 | Kato et al. | |
| 6,460,889 B2 * | 10/2002 | Iyanagi et al. | 280/784 |
| 6,511,119 B2 * | 1/2003 | Takase et al. | 296/187.09 |

FOREIGN PATENT DOCUMENTS

| | | |
|---|---|---|
| DE | 38 00 944 C1 | 1/1989 |
| DE | 43 02 240 A1 | 8/1993 |
| DE | 43 26 668 A1 | 2/1995 |
| DE | 44 26 880 A1 | 2/1996 |
| EP | 0 921 051 A2 | 6/1999 |
| JP | 58-35471 | 8/1956 |
| JP | 55-55010 | 4/1980 |
| JP | 2-30708 | 2/1990 |
| JP | 04-252782 | 9/1992 |
| JP | 4-135805 | 12/1992 |
| JP | 05-124542 | 5/1993 |
| JP | 06-016154 | 1/1994 |
| JP | 06-298121 | 10/1994 |
| JP | 07-025357 | 1/1995 |
| JP | 08-239056 | 9/1996 |
| JP | 11-342869 | 12/1999 |
| JP | 2000-071734 | 3/2000 |

* cited by examiner

*Primary Examiner*—Paul N. Dickson
*Assistant Examiner*—Laura B. Rosenberg
(74) *Attorney, Agent, or Firm*—McDermott Will & Emery LLP

(57) ABSTRACT

A front body structure includes a front-wheel movement promoting mechanism arranged between a front wheel (22) and a suspension member (19) that promotes a backward movement of the front wheel (22) when a collision load (F1) is applied to the front wheel (22) while being accompanied with a backward deformation of the outer end (12a) of a bumper reinforcement (12). The front-wheel movement promoting mechanism may be a notch (35) formed in the suspension member (19) to allow the front wheel (22) to move backward in early stages of the collision. Then, the front wheel (22) interferes with an outrigger (15) and a side sill (14), preventing a vehicle cabin from being deformed.

7 Claims, 18 Drawing Sheets

US 6,994,374 B2

FRONT BODY STRUCTURE FOR VEHICLE

BACKGROUND OF THE INVENTION

The present invention relates to a front body structure for a vehicle. More particularly, it relates to a front body structure which is adapted so as to disperse a collision load at the vehicle front collision to a body framework member through a front wheel.

Japanese Patent Application Laid-open No. 11-342869 discloses one front body structure for a vehicle, which is designed so as to moderate the concentration of a deformation force on the rear end of a reinforcement member at the connection between a front pillar and a side sill when the front wheel interferes with the front pillar and the front end of the side sill due to the collision load inputted from the front of the vehicle, in order to absorb the collision energy at the front end of the side sill.

SUMMARY OF THE INVENTION

In the above-mentioned front body structure, however, the front wheel produces a resistance force in process of its moving backward due to the front collision load since the front wheel is supported on the side of a vehicle body with a predetermined bearing rigidity. Consequently, the front wheel interferes with the side sill in the latter half of serial collision behavior.

In the former half of serial collision behavior, therefore, the load to shift the front wheel backward is collectively transmitted to a side member and an extension side member through the intermediary of a suspension arm carrying the front wheel and a suspension member.

That is, at the beginning of collision, it is difficult to sufficiently transmit or disperse the collision load to the side sill which is disposed outside the extension side member in the width direction of the vehicle and which has a high rigidity.

In such a situation, it is an object of the present invention to provide a front body structure that allows the front wheel to move back positively due to the front collision load and interfere with the side sill in early stages of the collision, thereby allowing the collision load to be dispersed to the body.

According to the present invention, the above-mentioned object is accomplished by a front body structure for a vehicle, comprising a pair of side members arranged on both sides of a front compartment of the vehicle to extend in a fore-and-aft direction of the vehicle, a front-end member connected to respective front ends of the side members so as to be laid across the side members, an extension side member arranged behind each of the side members in succession, a side sill arranged outside the extension side member in a width direction of the vehicle so as to extend in substantially parallel with the extension side member, an outrigger connected to both a front end of the extension side member and a front end of the side sill, a suspension arm attached to each of the side members through an arm support member, a front wheel supported by the suspension arm and disposed between the outrigger and one outer end of the front-end member in the width direction of the vehicle and a front-wheel movement promoting mechanism arranged between the front wheel and the arm support member, for promoting a backward movement of the front wheel, the backward movement being caused by a collision load acting on the front wheel while being accompanied with a backward deformation of the outer end of the front-end member.

BRIEF DESCRIPTION OF THE DRAWINGS

FIGS. 5A and 5B are perspective views showing the front part of a suspension arm in the first embodiment of the invention, in which FIG. 5A shows its exploded condition and FIG. 5B shows the assembled condition;

FIGS. 7A and 7B are perspective views showing the rear part of the suspension arm in the first embodiment of the invention, in which FIG. 7A shows its exploded condition and FIG. 7B shows the assembled condition;

DESCRIPTION OF THE PREFERRED EMBODIMENT

Figure 1:
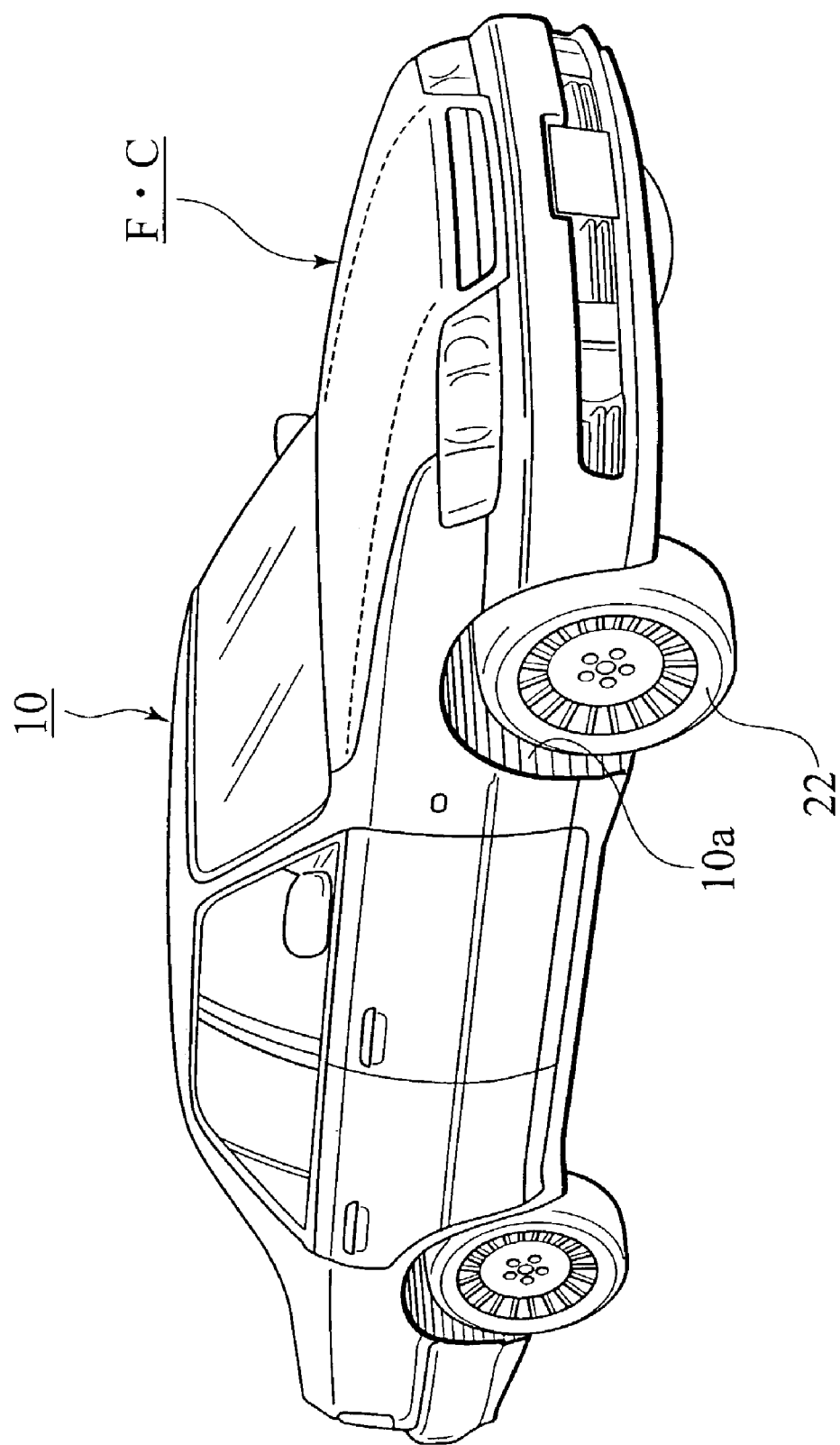
FIG. 1 is a perspective view of an automobile to which the present invention is applied.

Referring to accompanying drawings, various embodiments of the present invention will be described below.

[1st. Embodiment]

FIGS. 1 to 11 show the first embodiment of the front body structure in accordance with the present invention. The front body structure of the embodiment is applicable to a front compartment FC of a vehicle body 10 of FIG. 1. As representatively shown in FIG. 2, the front body structure is equipped with a pair of side members (only one shown) 11 extending in a fore-and-aft direction of the vehicle, on both sides of the vehicle body 10. The side members 11 have their front ends joined to a bumper reinforcement 12 forming a framework of a not-shown bumper. Noted that the bumper reinforcement 12 may be referred as "a front-end member" of the invention. The bumper reinforcement 12 has its ends 12a each positioned outside in the width direction of the vehicle to project from the closer side member 11 by a predetermined amount L outward.

Behind each of the side members 11, an extension side member 13 is formed in succession with the side member 11. Outside the side members 11 in the width direction of the vehicle, a pair of side sills 14 are arranged so as to be substantially parallel with the side members 11. On each side of the vehicle, the front end of the extension side member 13 is connected with the front end of the side sill 14 through an outrigger 15. The outrigger 15 has its outside part (in the width direction of the vehicle) inclined toward the vehicle rear part.

A floor panel 16 is laid on the extension side members 13 and joined to the side sills 14. A cabin 17 is defined above the floor panel 16. The floor panel 16 is provided, at its central part, with a tunnel part 16a which swells up while extending in the fore-and-aft direction of the vehicle.

Figure 3:
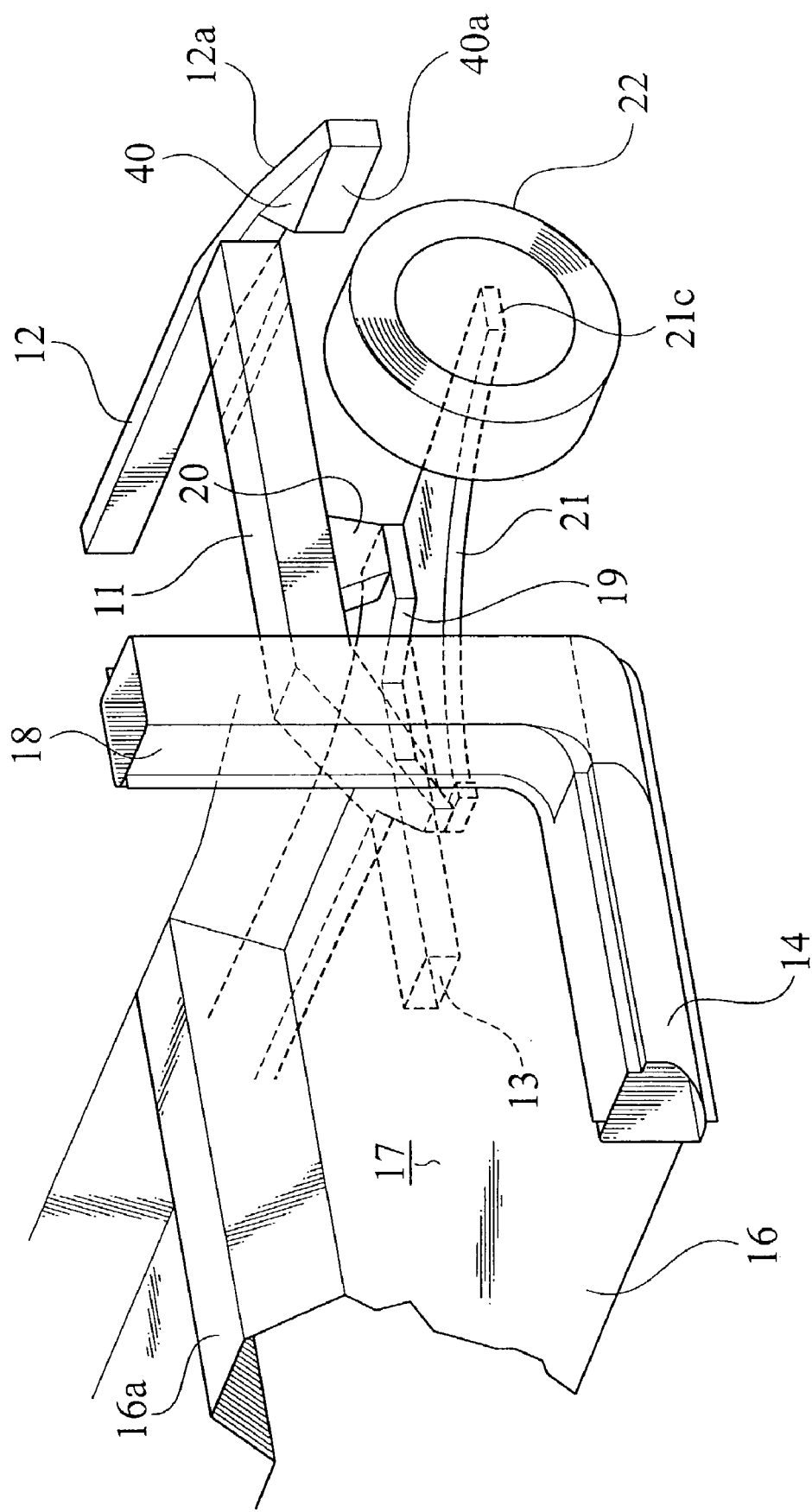
FIG. 3 is a perspective view showing the right-and-front framework of the front body structure in accordance with the first embodiment of the invention.

At the front end of each side sill 14, as shown in FIG. 3, a front pillar 18 is arranged to stand upright.

Figure 4:
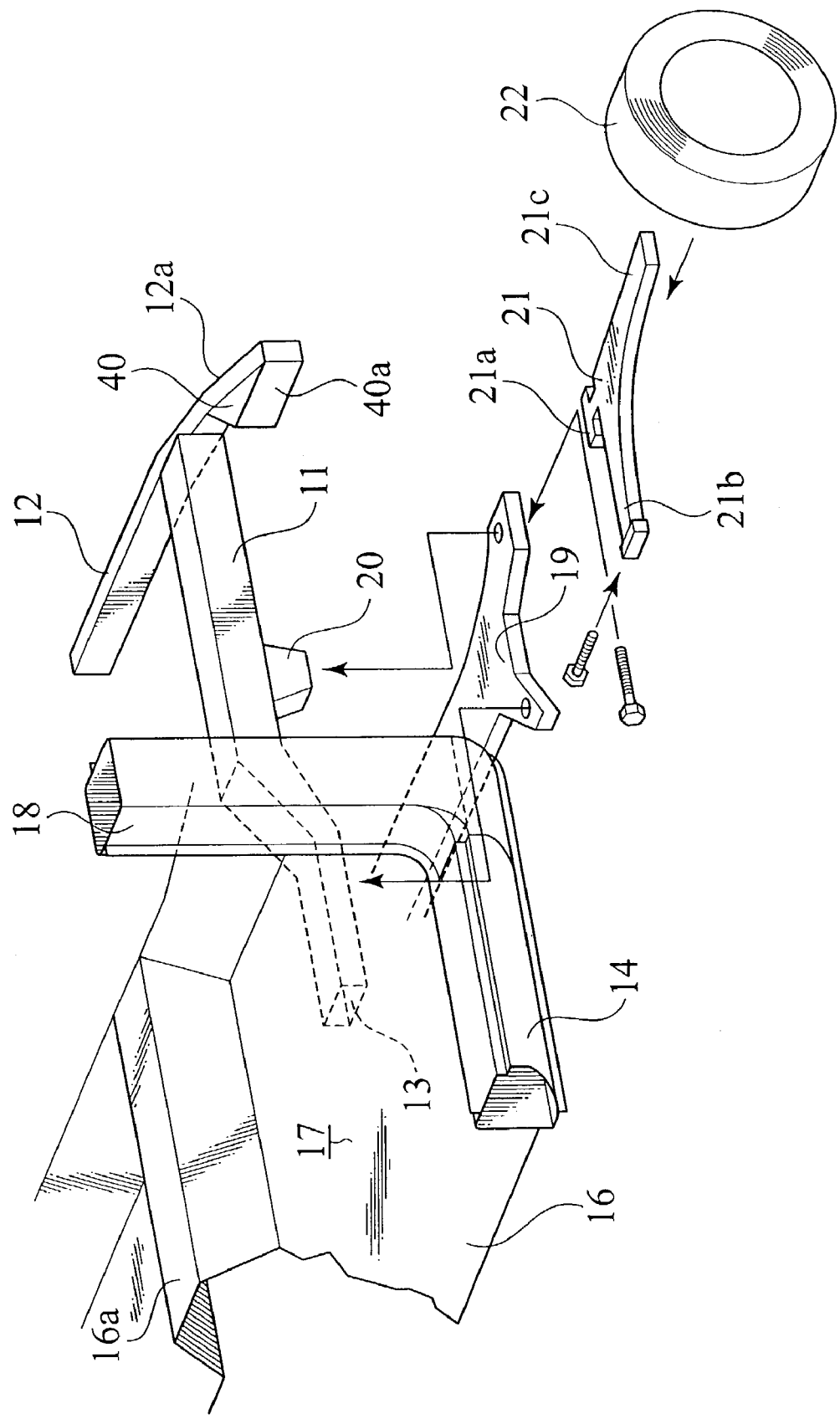
FIG. 4 is an exploded perspective view showing a front-wheel mount on the right-and-front side of the vehicle body in accordance with the first embodiment of the invention.

On the underside of the side members 11, there is arranged a suspension member 19 forming an arm support member of the invention, as shown in FIG. 4.

The suspension member 19 has its both ends (in the width direction of the vehicle) each supported by the side member 11 and the extension side member 13 at front and rear points. As shown in FIGS. 3 and 4, the suspension member 19 is joined, at the front point of each end, to an attachment part 20 fixed on the underside of the side member 11 and also joined, at the rear point of each end, to the underside of the extension side member 13.

As shown in FIG. 3, a front wheel 22 is attached to each end of the suspension member 19 through a suspension arm 21.

The suspension arm 21 is provided, on its side close to the suspension member 19, with a front arm 21a as a front attachment part and a rear arm 21b as a rear attachment part. The front wheel 22 is supported by a supporting end 21c of the suspension arm 21, which projects apart from the suspension member 19 outward.

Figure 5A:
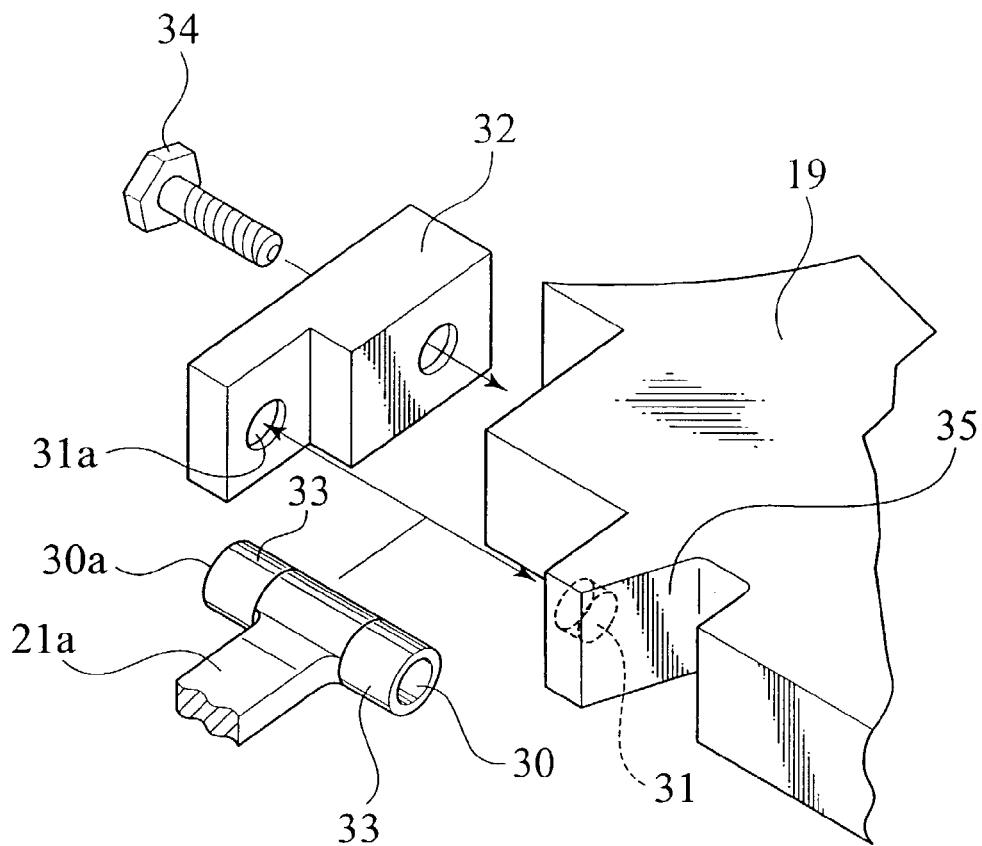
Figure 5B:
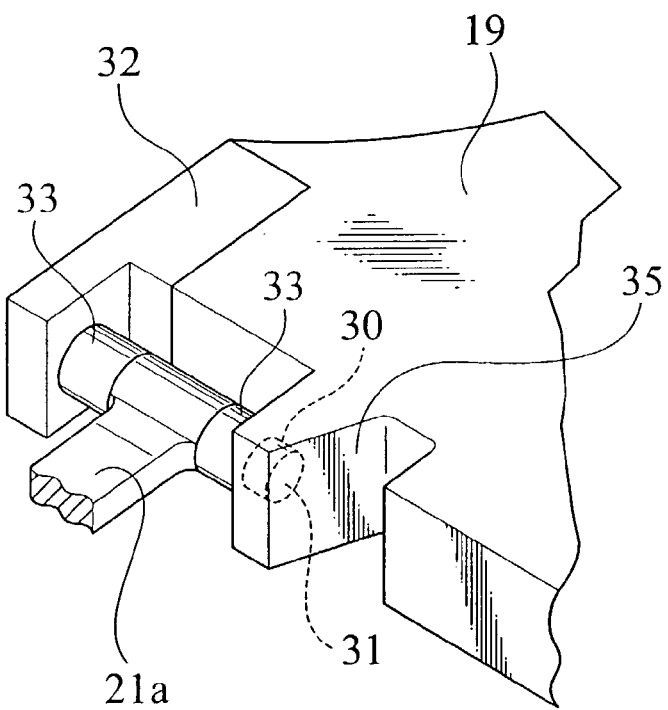
Figure 6:
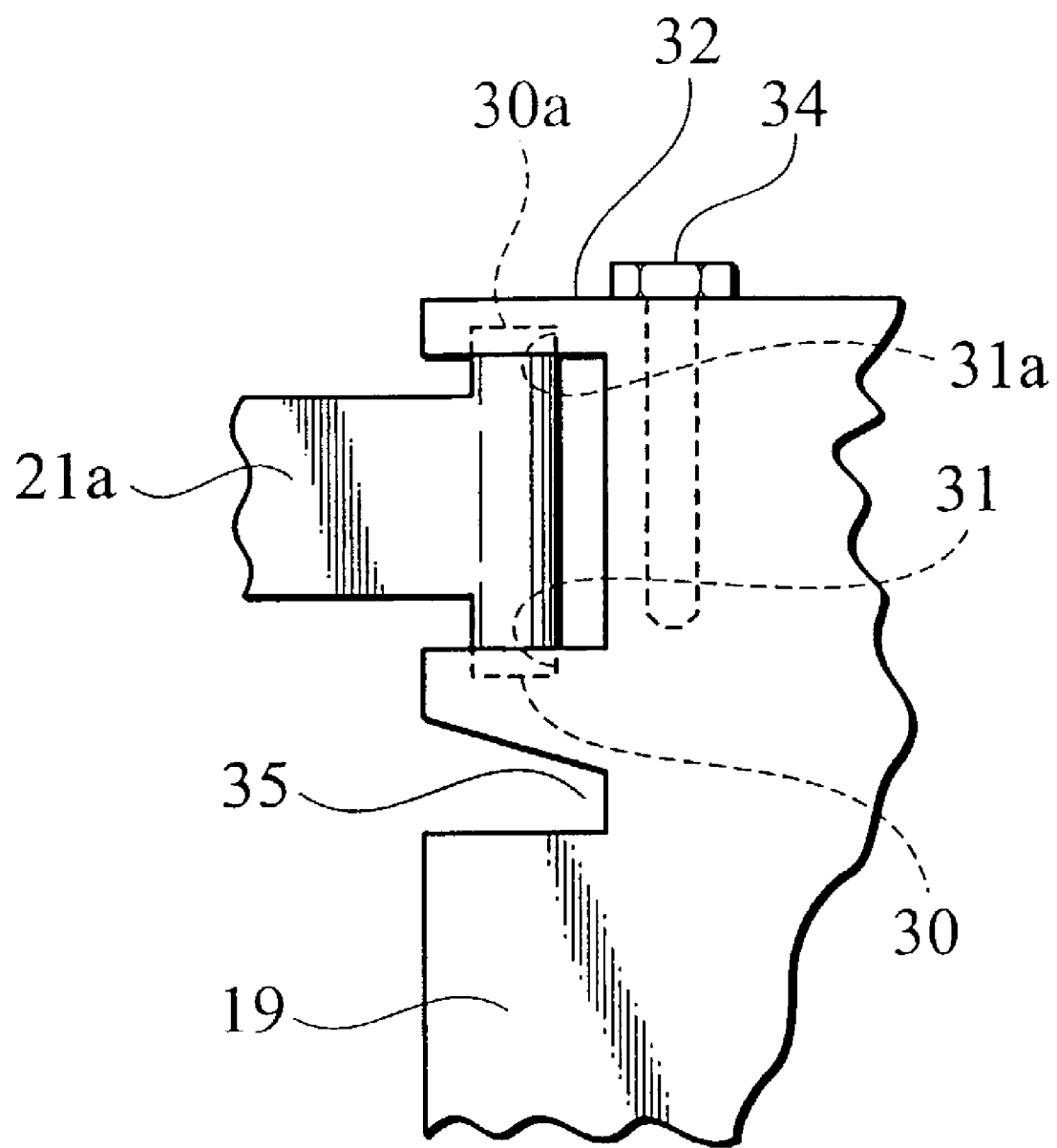
FIG. 6 is an enlarged bottom view of a circle part A of FIG. 2.

The front arm 21a has a pair of cylindrical parts 30, 30a formed on both sides to project in the fore-and-aft direction of the vehicle, as shown in FIGS. 5A and 5B. The cylindrical part 30 is engaged into a fit hole 31 formed in the suspension member 19, through a rubber bush 33. While, the other cylindrical part 30a is engaged into a fit hole 31 formed in a front coupling member 32 different from the suspension member 19, through another rubber bush 33. The front coupling member 32 is fixed to the suspension member 19 by means of a bolt 34.

In the vicinity of the fit hole 31 on the rear side of the vehicle, there is formed a U-shaped notch 35 operating as a mechanism for promoting the movement of the front wheel.

Figure 7A:
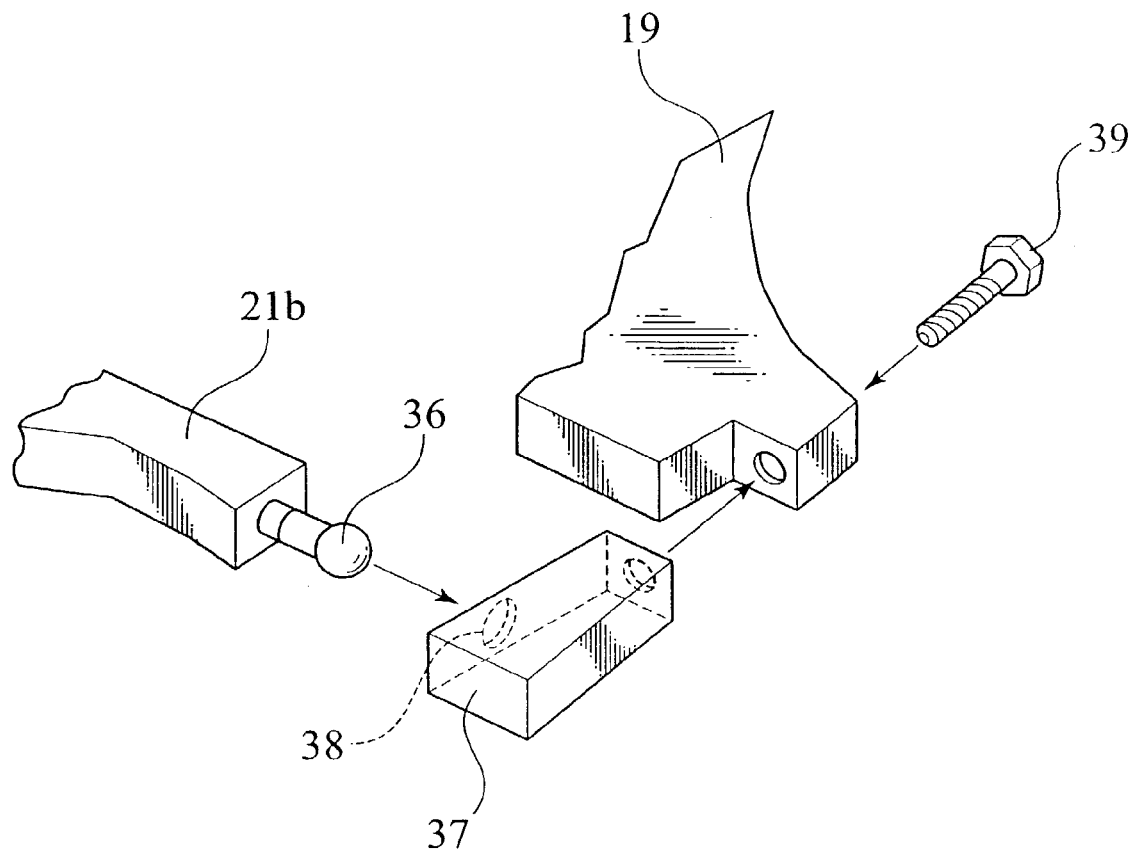
Figure 7B:
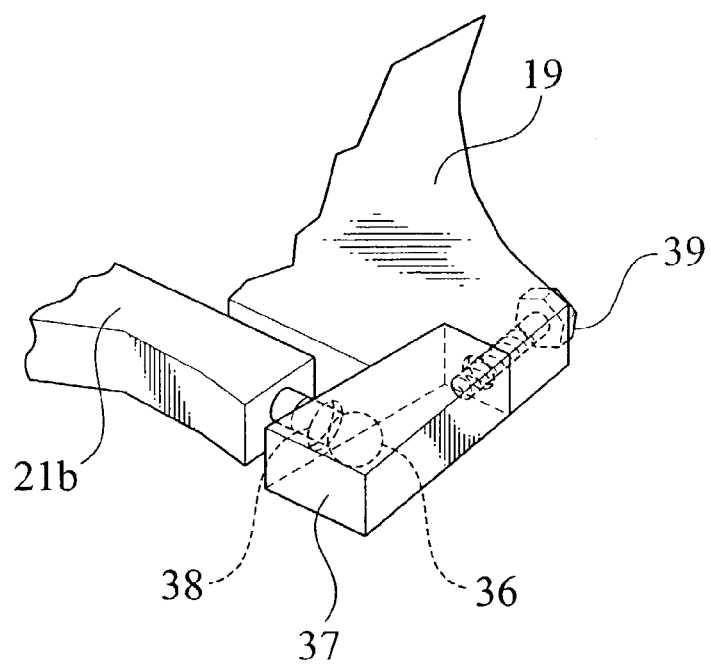

On the other hand, as shown in FIGS. 7A and 7B, the rear arm 21b is provided with a joint ball 36 projecting toward the rear side of the vehicle.

The joint ball 36 is fitted into a receiving part 38 formed in a rear coupling member 37 different from the suspension member 19. Similarly to the front coupling member 32, the rear coupling member 37 is fixed to the suspension member 19 by means of a bolt 39.

In this way, owing to the provision of the notch 35 in the suspension member 19, it is established that an attachment strength about the front arm 21a becomes smaller than that about the rear arm 21b.

Meanwhile, as shown in FIG. 1, it is noted that the front wheel 22 is accommodated in a wheel house 10a on each side of the vehicle. Then, the front wheel 22 is also arranged between the outer end 12a of the bumper reinforcement 12 and the outrigger 15, as shown in FIG. 2.

The bumper reinforcement 12 is provided, on its rear face of each outer end 12a opposing the front wheel 22, with a guide member 40 as a guide mechanism.

Figure 2:
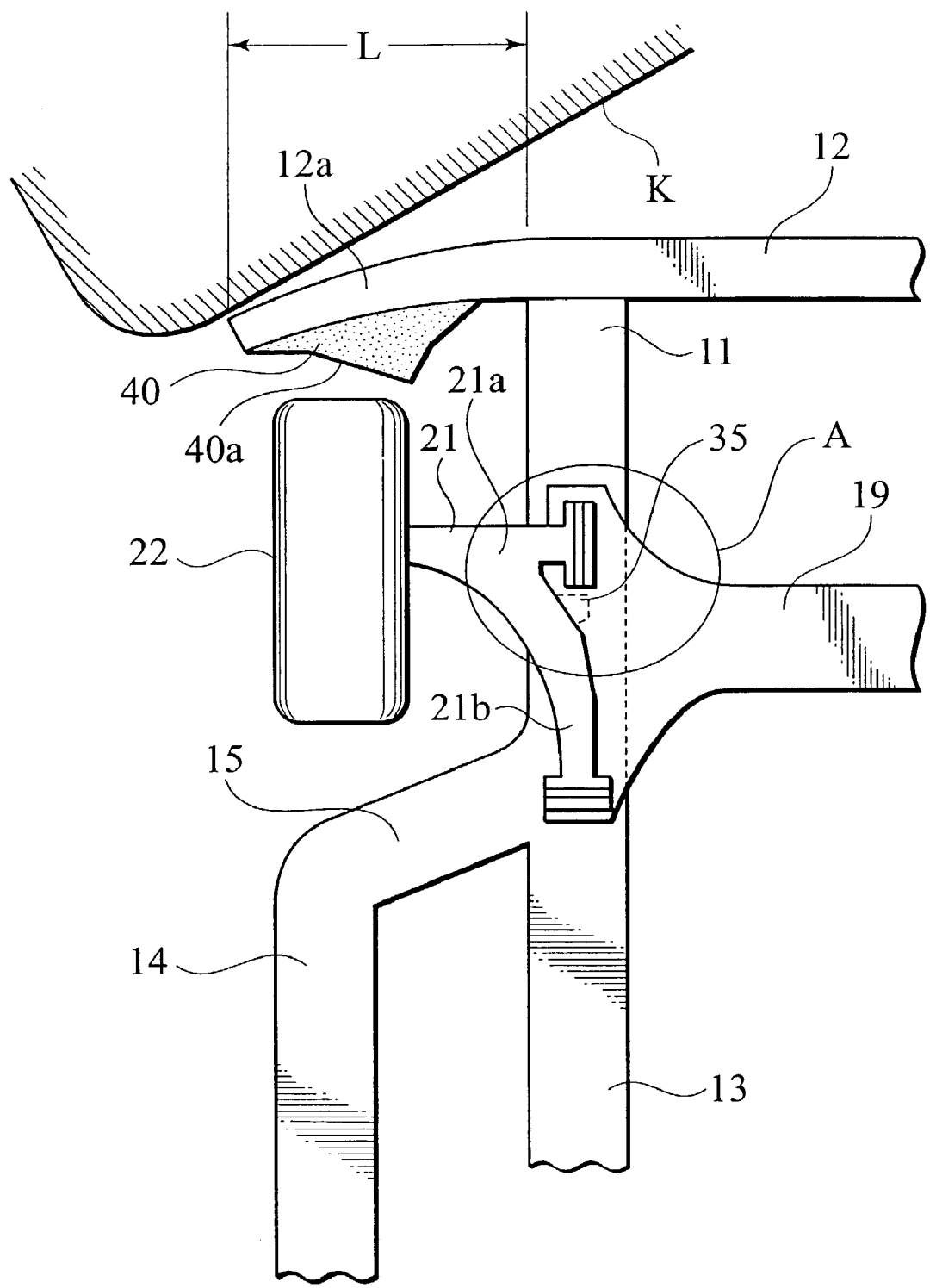
FIG. 2 is a schematic bottom view showing a right-and-front framework of the front body structure in accordance with the first embodiment of the invention.

As shown in FIG. 2, the guide member 40 is formed to be a substantial triangle in plan view, having an attachment face (as the triangle base) for the bumper reinforcement 12 and an outside slanted face forming an abutment face 40a against the front wheel 22.

The above-mentioned front body structure of this embodiment operates as follows. As shown in FIG. 2, if a vehicle K has a collision with the right-and-front side of the vehicle body 10, then a collision load F1 is exerted to the outer end 12a of the bumper reinforcement 12 in the width direction of the vehicle, so that the outer end 12a is deformed backward as shown in FIG. 8.

Figure 8:
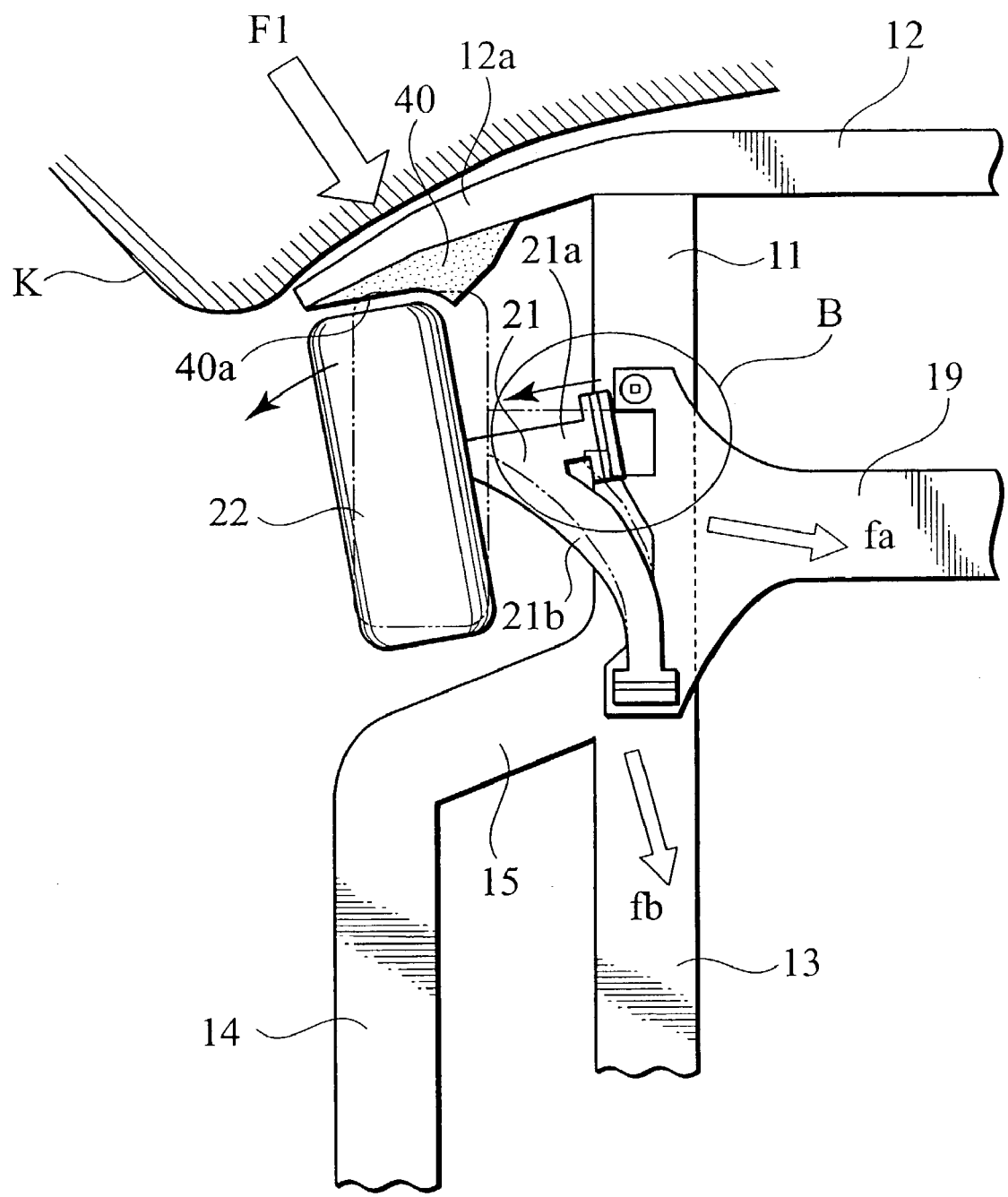
FIG. 8 is a bottom view of the front-and-right part of the vehicle body at the initial stage of collision, in accordance with the first embodiment of the invention.

Consequently, the abutment face 40a of the guide member 40 interferes with the front end of the front wheel 22, so that the front wheel 22 is outward steered from the condition of FIG. 2 to the condition of FIG. 8 due to the outward inclination of the abutment face 40a.

Then, the collision load F1 exerted to the front wheel 22 is transmitted to the suspension member 19 through the suspension arm 21, in the form of a dispersion load Fa in the width direction of the vehicle. Also, the same load F1 is transmitted to the extension side member 13 through the suspension arm 21, in the form of a dispersion load Fb in the axial direction of the member 13.

Figure 9:
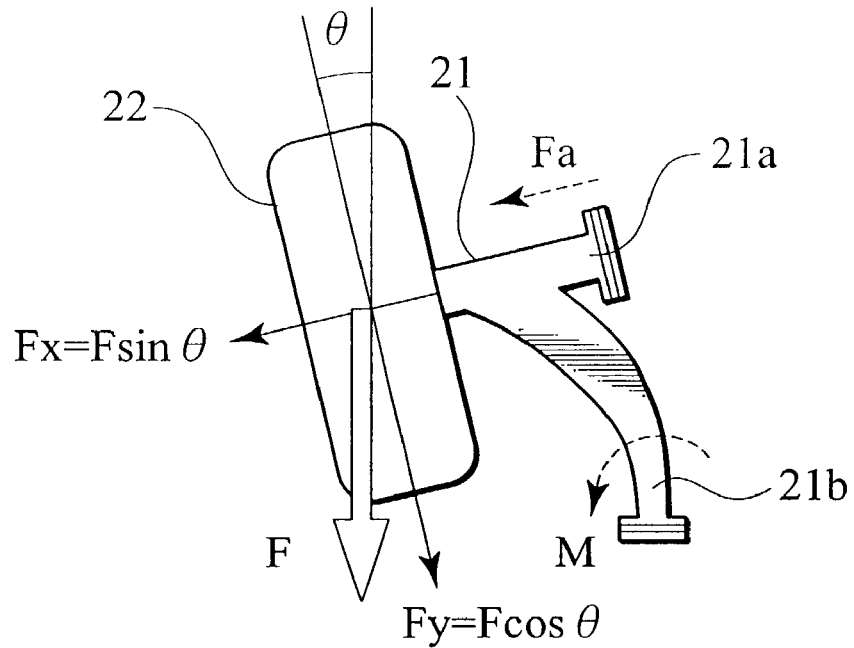
FIG. 9 is an explanatory view showing a load acting on the front wheel at the initial stage of collision, in accordance with the first embodiment of the invention.

As to the collision load F applied on the front wheel 22 steered outward (steering angle: θ), as shown in FIG. 9, the attachment point of the front wheel 22 to the suspension arm 21 is subjected to a lateral force (component) Fx=Fsin θ and a fore-and-aft force (component) Fy=Fcos θ.

Figure 10:
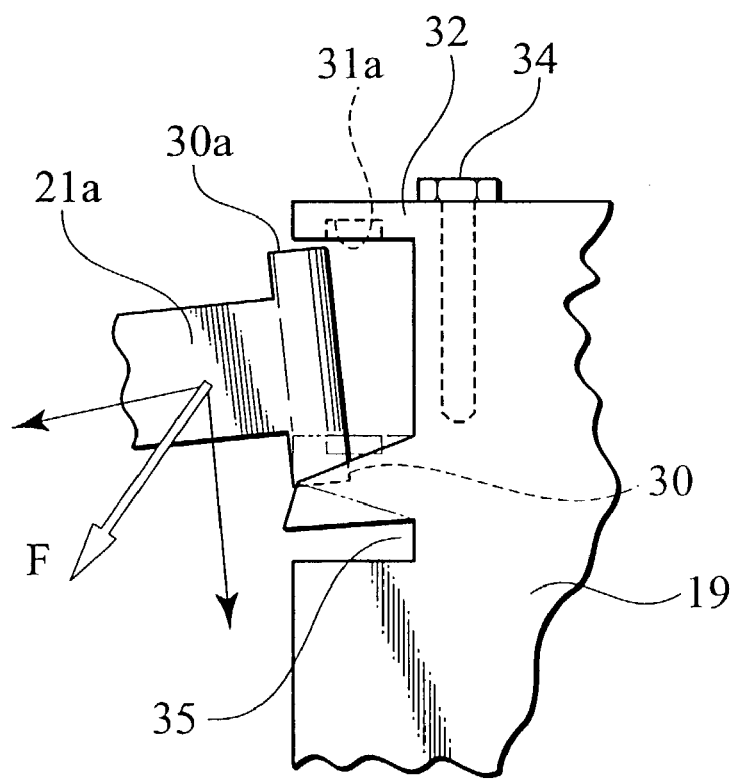
FIG. 10 is an enlarged bottom view of a circle part B of FIG. 8.
Figure 11:
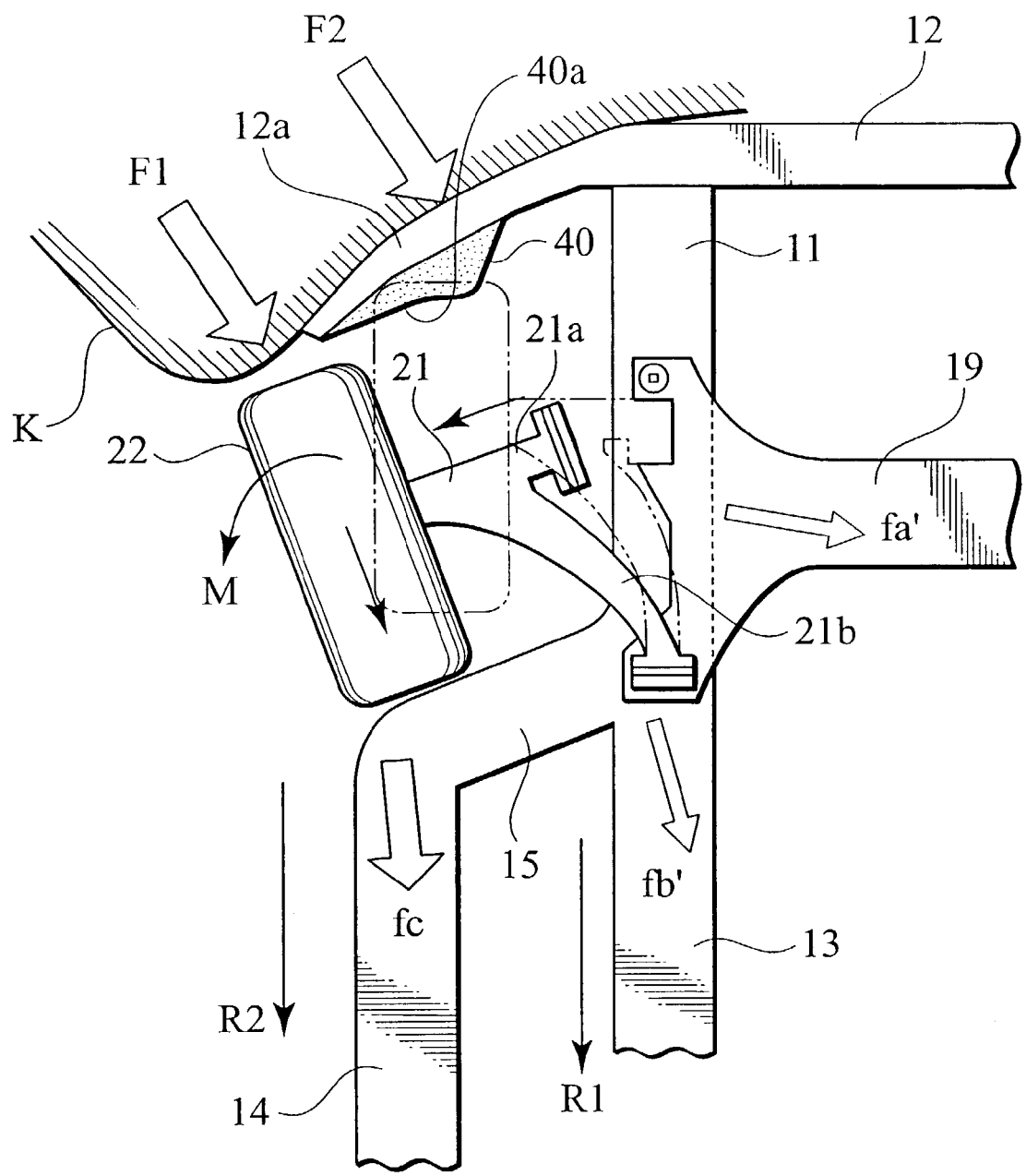
FIG. 11 is a bottom view of the front-and-right part of the vehicle body at the collision in further progress, in accordance with the first embodiment of the invention.

Therefore, due to the lateral force Fx, an outward transverse force Fa (see FIG. 9) is applied on the front arm 21a of the suspension arm 21. It is noted that the magnitude of the transverse force Fa amounts to dozens of gravity (G) at the vehicle collision while the same magnitude is only several gravity (G) in the normal traveling condition. Consequently, as shown in FIG. 10, the suspension member's portion around the fit hole 31 for engagement with the cylindrical part 30 of the front arm 21a is deformed toward the notch 35, so that the front arm 21a is finally detached from the suspension member 19 due to the disengagement of the cylindrical parts 30, 30a from the fit holes 31, 31a.

Acting on the rear arm 21b, a moment M produced by the fore-and-aft force Fy allows the rear arm 21b to be deformed backward and the front wheel 22 to move back positively. Finally, the front wheel 22 interferes with the vicinity of the side sill 14 of the outrigger 15.

In addition to the above collision load F1, subsequently, when another collision load F2 (see FIG. 11) is further applied on the outer end 12a of the bumper reinforcement 12 with a further progress of collision behavior, the front wheel 22 is subjected to a great load in comparison with the load at the initial stage of collision.

Then, most of the load on the front wheel 22 is transmitted to the side sill 14. Thus, both of loads fa' and fb', which are respectively transmitted to the suspension member 19 and the extension side member 13 after the front wheel 22 has interfered with the outrigger 15, are respectively small in comparison with a load fc transmitted to the side sill 14 (i.e. fc>fa', fb'). In other words, according to the embodiment, it is possible to increase a partial charge of collision load on the side sill 14.

When the partial charge of collision load on the side sill 14 is increased in this way, it is possible to disperse a load via the front wheel 22 to the other framework members effectively because the rigidity of the side sill 14 is higher than that of any other framework member, whereby the deformation of the vehicle cabin can be restricted effectively.

Additionally, according to the embodiment, there are established, during the regression of the front wheel 22, a first load-transmission route R1 where a load is transmitted from the suspension arm 21 to the side member 11 and extension side member 13 through the suspension member 19 and also a second load-transmission route R2 where a load is transmitted from the front wheel 22 to the side sill 14 through the outrigger 15.

Then, when the collision loads F1, F2 act on the wheel 22, the notch 35 allows the front wheel 22 to be moved back in early stages of the collision. Consequently, there can be established the first load-transmission route R1 and the second load-transmission route R2 simultaneously. That is, since the above collision loads F1, F2 are respectively transmitted to various framework members, for example, the side member 11, the extension side member 13, the side sill 14, etc. through the first load-transmission route R1 and the second load-transmission route R2 in early stages of the collision, it becomes possible for the whole vehicle body to disperse the collision loads effectively.

According to the embodiment, since the bumper reinforcement 12 is provided, on each outer end 12a, with the guide member 40 that controls a timing of starting the backward movement of the front wheel 22 and also an inclination of the front wheel 22 in the steered direction when the load F1 is inputted to the wheel 22, it is possible to control the load-transmission route through which the collision load F1 is transmitted to the vehicle framework members, for example, the side member 11, the extension side member 13, the side sill 14, etc. precisely, whereby the dispersion efficiency about the collision load transmitted from the front wheel 22 to the vehicle framework members can be enhanced.

[2nd. Embodiment]

Figure 12:
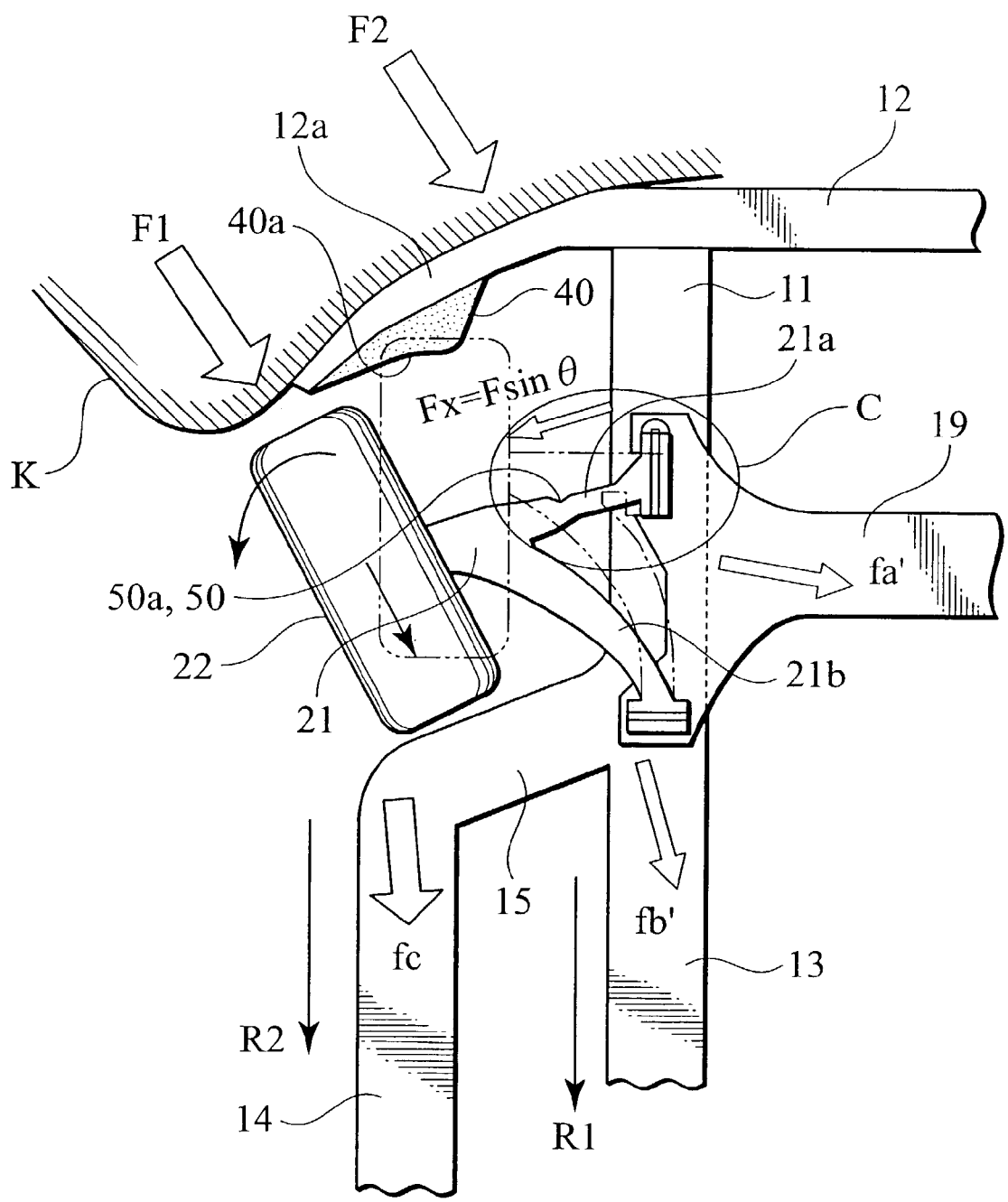
FIG. 12 is a schematic bottom view showing the right-and-front framework of the front body structure in accordance with the second embodiment of the invention.
Figure 13:
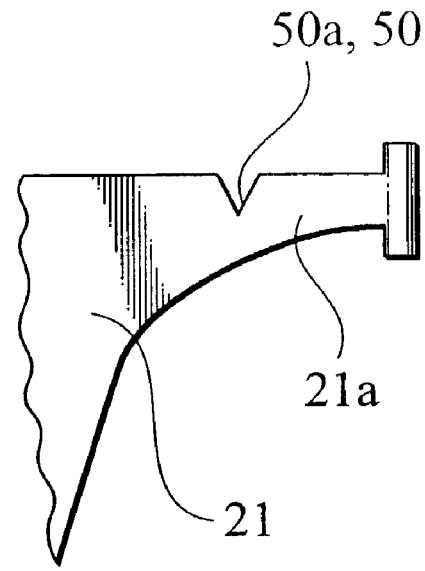
FIG. 13 is an enlarged bottom view of a circle part C of FIG. 12.
Figure 14:
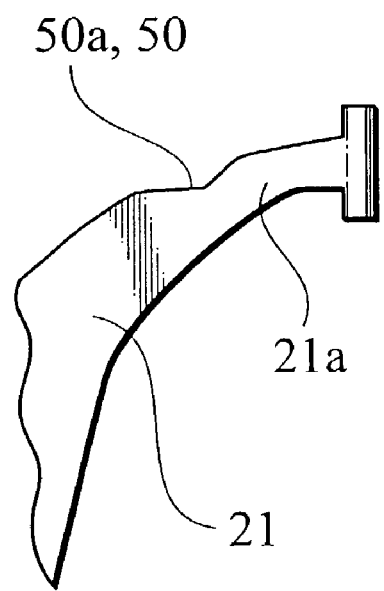
FIG. 14 is an enlarged bottom view of the circle part C subjected to the collision load.

FIGS. 12 to 14 show the second embodiment of the present invention. In the second embodiment, elements similar to those of the first embodiment are indicated with the same reference numerals respectively and their overlapping descriptions are eliminated.

According to the second embodiment, the front-wheel movement promoting mechanism comprises an easy-deformable part 50 formed in the suspension arm 21, as shown in FIG. 12.

In detail, as shown in FIG. 13, the easy-deformable part 50 includes a V-shaped notch 50a formed in a front edge of the front arm 21a. Owing to this configuration of the easy-deformable part 50, when the collision load F1 is exerted to the front wheel 22, a stress concentrates in the notch 50a, so that the front arm 21a is deformed backward, as shown in FIG. 14.

Similarly to the first embodiment of the invention, when the collision load F1 is exerted to the front wheel 22, the afore-mentioned lateral force Fx (=Fsin θ) acts on the front arm 21a, so that the notch 50a begins its deformation. Since the deformation of the notch 50a causes the rear arm 21b to be deformed, the front wheel 22 moves back. In this way, the rear part of the front wheel 22 interferes with the outrigger 15 (part) in the vicinity of the side sill 14.

In addition to the above collision load F1, subsequently, the collision load F2 (see FIG. 12) is further applied on the outer end 12a of the bumper reinforcement 12 with a further progress of collision behavior. Nevertheless, since the load through the front wheel 22 is mainly transmitted to the side sill 14 through the second load-transmission route R2, both of loads fa' and fb', which are respectively transmitted to the suspension member 19 and the extension side member 13 through the first load-transmission route R1, are respectively small in comparison with a load fc transmitted to the side sill 14. In other words, according to the second embodiment, the load-dispersion can be attained corresponding to the strength of the body framework members, for example, the side member 11, the extension side member 13, the side sill 14, etc.

Furthermore, according to the embodiment, it is possible to lighten the burden of loads imposed on the first load-transmission route R1 and the second load-transmission route R2 since the suspension arm 21 itself is capable of partial absorption of load exerted to the front wheel 22 owing to the provision of the notch 50a.

In the modification of the above-mentioned embodiment, the notch 50a may be replaced by other means where a stress is easy to concentrate, for example, a thin-walled part provided in the suspension arm 21.

[3rd. Embodiment]

FIGS. 15 to 18 show the third embodiment of the present invention. Also in the third embodiment, elements similar to those of the first embodiment are indicated with the same reference numerals respectively and their overlapping descriptions are eliminated.

Figure 15:
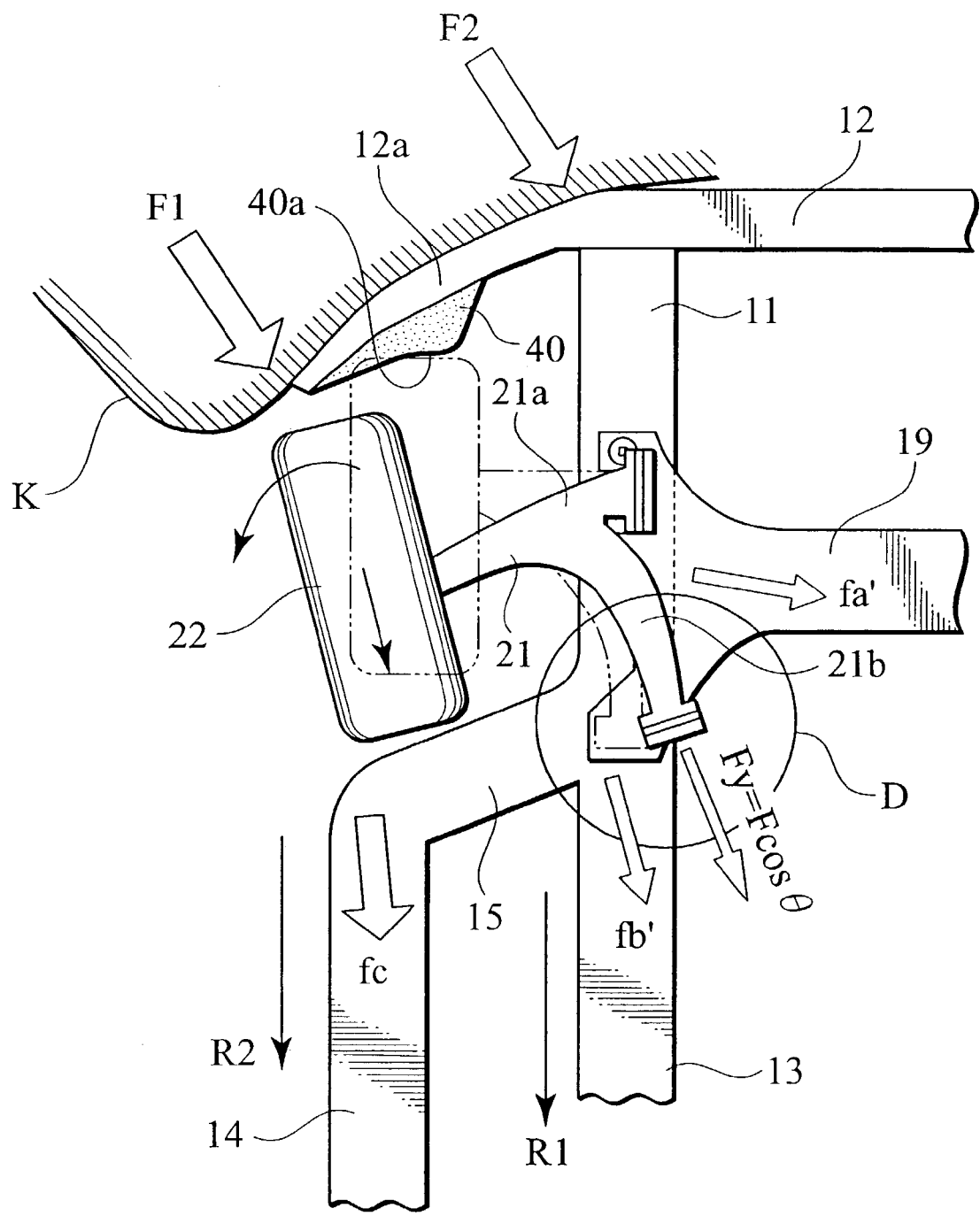
FIG. 15 is a schematic bottom view showing the right-and-front framework of the front body structure in accordance with the third embodiment of the invention.
Figure 16:
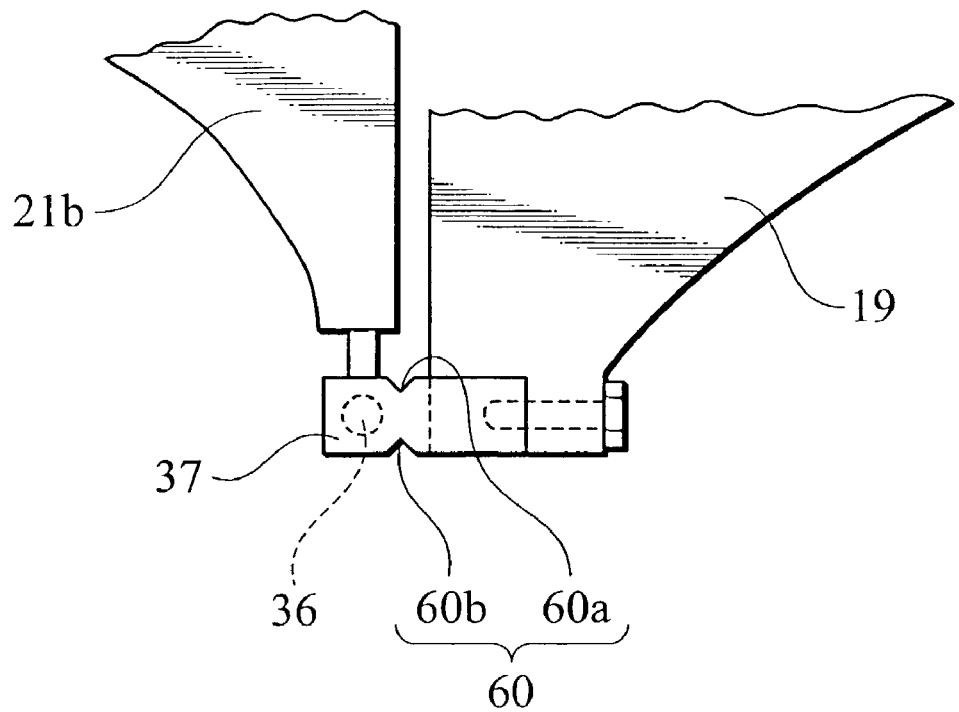
FIG. 16 is an enlarged bottom view of an attachment part of a suspension rear arm of the third embodiment of the invention.

According to the third embodiment, the front-wheel movement promoting mechanism comprises a rear-part deforming device 60 formed in the suspension member 19 as the arm support member of the invention, as shown in FIG. 15 and FIG. 16.

The rear-part deforming device 60 is formed in the rear coupling member 37 for attaching the rear arm 21b of the suspension arm 21 to the suspension member 19. In detail, the rear-part deforming device 60 includes V-shaped notches 60a, 60b formed in front and rear edges of the rear coupling member 37 in the vicinity of the receiving part 38 for engagement with the joint ball 36.

Additionally, a fitting strength with which the front arm 21a of the suspension arm 21 is attached to the suspension member 19 is established larger than another fitting strength with which the rear arm 21b of the suspension arm 21 is attached to the suspension member 19.

Figure 17:
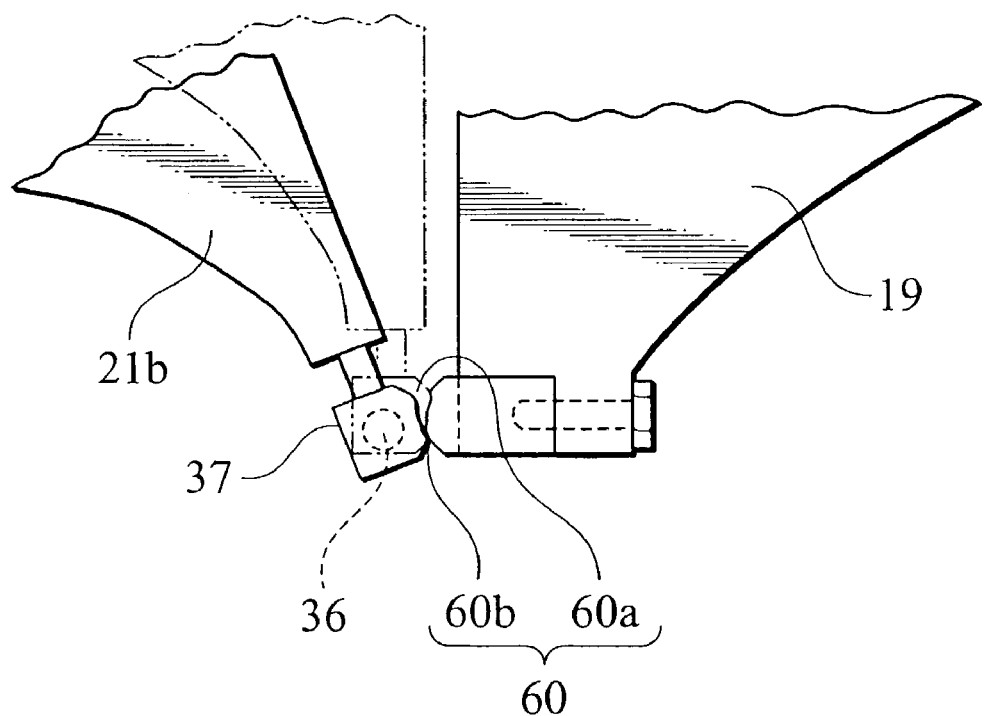
FIG. 17 is an enlarged bottom view of a circle part D of FIG. 15.
Figure 18:
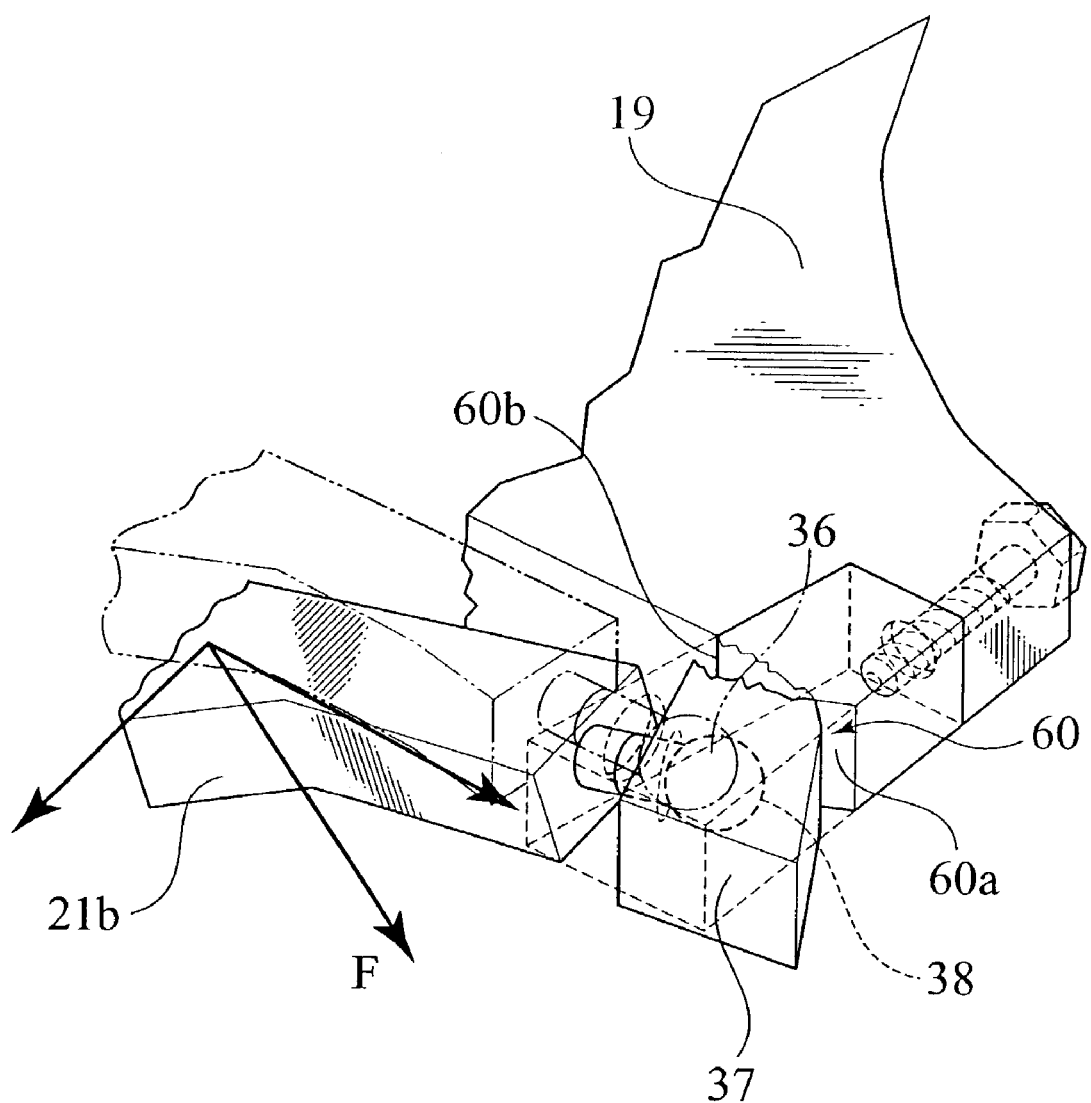
FIG. 18 is an enlarged perspective view of the deformed attachment part of the suspension rear arm of the third embodiment of the invention.

It is noted that the magnitude of the load F1 applied on the front wheel 22 amounts to dozens of gravity (G) at the vehicle collision while the same magnitude is only several gravity (G) in the normal traveling condition. Therefore, as shown in FIGS. 17 and 18, the fore-and-aft force Fy (=Fcos θ) (see FIG. 9) causes the rear coupling member 37 to be broken through the notches 60a, 60b.

Consequently, as shown in FIG. 15, the suspension arm 21 is greatly bent while concentrating a stress on the front arm 21a, so that the front wheel 22 is shifted backward to interfere with the outrigger 15 (part) in vicinity of the side sill 14.

Thus, according to the third embodiment, it is possible to disperse a load transmitted through the front wheel 22 with a relationship of:

$$fc \gg fa' > fb'$$

Particularly, when the strength of the side member 11 is larger than that of the extension side member 13, the effect of the third embodiment is enhanced furthermore.

According to the embodiment, it is possible to lighten the burden of loads imposed on the first load-transmission route R1 and the second load-transmission route R2 since the suspension member 19 itself is capable of partial absorption of a load exerted to the front wheel 22 owing to the deforming function of the rear-part deforming device 60 as the front-wheel movement promoting mechanism. In addition, it is possible to improve a load-dispersion efficiency without changing the load-transmission ratio of the front arm 21a of the suspension arm 21 to the rear arm 21b.

[4th. Embodiment]

Figure 19:
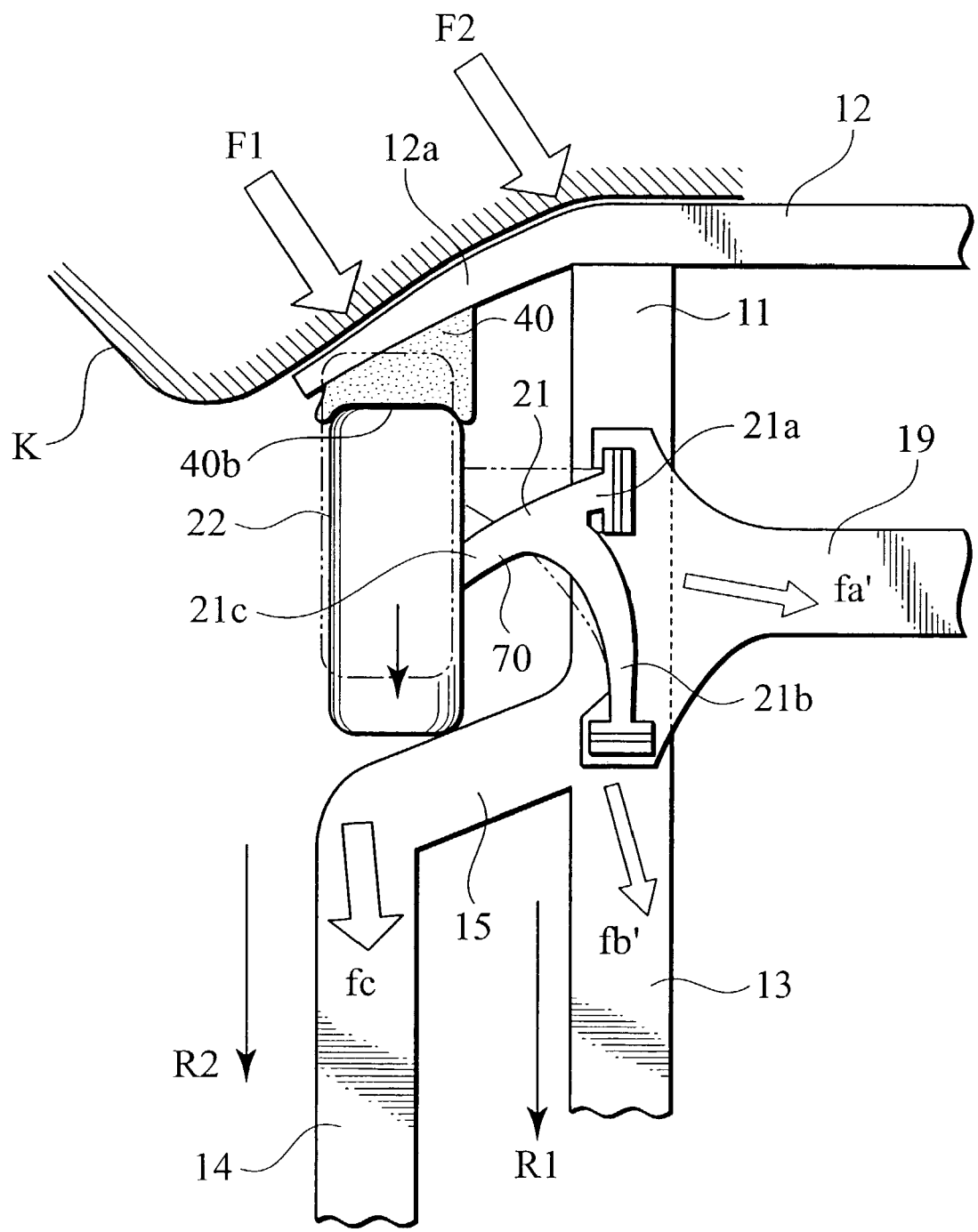
FIG. 19 is a schematic bottom view showing the right-and-front framework of the front body structure in accordance with the fourth embodiment of the invention.

FIG. 19 shows the fourth embodiment of the present invention. In the fourth embodiment, elements similar to those of the first embodiment are indicated with the same reference numerals respectively and their overlapping descriptions are eliminated.

According to the fourth embodiment of the invention, the suspension arm 21 is provided, at its supporting end 21c for supporting the front wheel 22, with a mid-arm 70 as the front-wheel movement promoting mechanism of the invention. Further, as the guide mechanism of the invention, there is provided the guide member 40 which is formed so as to steer the front wheel 22 into the fore-and-aft direction of the vehicle.

By adopting an appropriate measure, for example, reducing a ratio of its width to the length, the mid-arm 70 is constructed so as to be deformable by an input of the collision load F1. While, the guide member 40 is provided, on its rear end, with a recess 40b for receiving the front wheel 22. The recess 40b has a bottom face perpendicular to the fore-and-aft direction of the vehicle.

Therefore, since the input of the collision load F1 allows the front wheel 22 to move substantially backward, it becomes possible to control the load-dispersion ratio of the above first load-transmission route R1 to the second load-transmission route R2 more certainly.

As a result, without changing the load-sharing ratio of the load fa' acting on the side member 11 through the suspension arm 21 to the load fb' acting on the extension side member 13 greatly, the load-dispersion efficiency to the framework members can be enhanced furthermore.

[5th. Embodiment]

Figure 20:
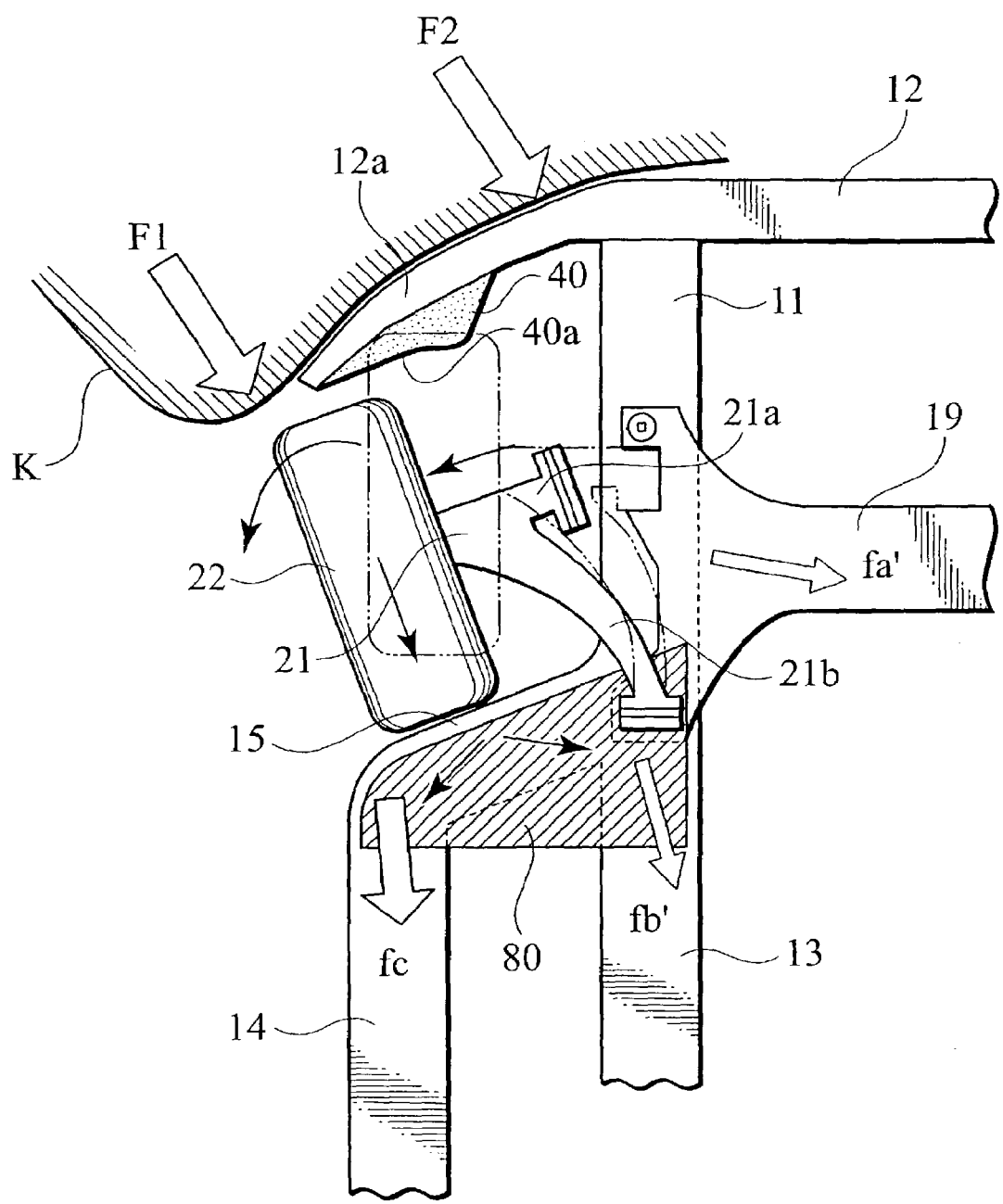
FIG. 20 is a schematic bottom view showing the right-and-front framework of the front body structure in accordance with the fifth embodiment of the invention.

FIG. 20 shows the fifth embodiment of the present invention. In the fifth embodiment, elements similar to those of the first embodiment are indicated with the same reference numerals respectively and their overlapping descriptions are eliminated.

According to this embodiment, there is provided a reinforcement 80 which connects the outrigger 15, the side sill 14 and the extension side member 13 with each other, as shown in FIG. 20.

Therefore, owing to the provision of the reinforcement 80, it is possible to improve a load-working point with which the front wheel 22 does interfere, in other words, the strength of the outrigger 15. Additionally, it is possible to transmit the collision loads F1, F2 to the side sill 14 and the extension side member 13 widely, whereby the dispersion-area of the loads (fc, fb') can be enlarged.

[6th. Embodiment]

Figure 21:
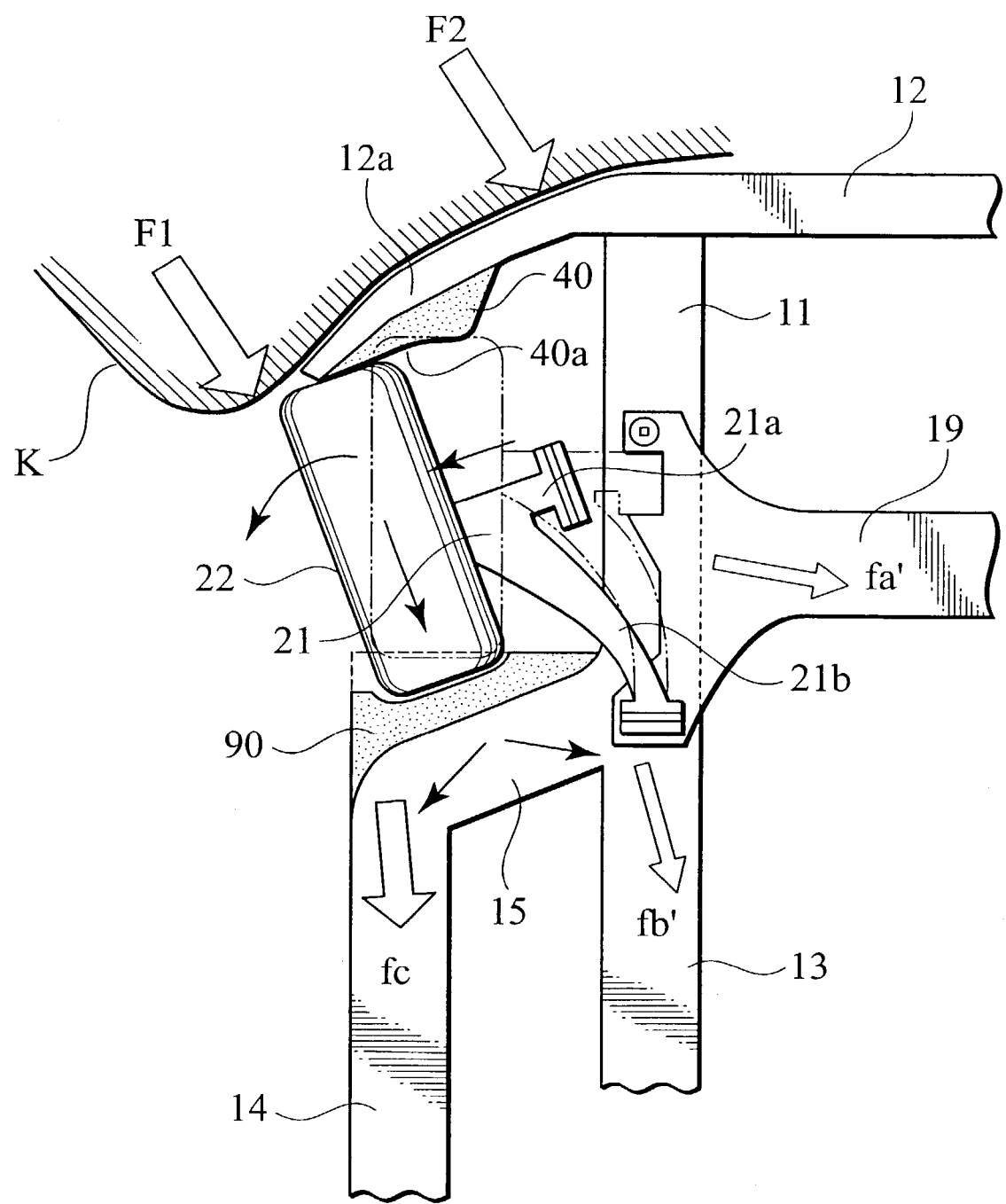
FIG. 21 is a schematic bottom view showing the right-and-front framework of the front body structure in accordance with the sixth embodiment of the invention.

FIG. 21 shows the sixth embodiment of the invention. Also in this embodiment, elements similar to those of the first embodiment are indicated with the same reference numerals respectively and their overlapping descriptions are eliminated.

In the sixth embodiment of the invention, the front body structure is provided, on the front side of the outrigger 15 opposing the front wheel 22, with a receiver (receiving member) 90 which interferes with the front wheel 22 moved backward by the above collision loads F1 and F2 thereby receiving the front wheel 22 while being deformed.

That is, owing to the deformation of the receiver 90 at the interference with the front wheel 22 moving back, the collision energy can be absorbed by the receiver 90 partially. Additionally, by adjusting a projecting amount of the receiver 90, it is possible to control a timing when the front wheel 22 moving back interferes with the outrigger 15.

Noted that although the reinforcement 80 and the receiver 90 of the above-mentioned embodiments are embodied in the front body structure of the first embodiment, these elements are applicable to the front body structure of the second embodiment, the third embodiment or the fourth embodiment, of course.

Finally, it will be understood by those skilled in the art that the foregoing descriptions are nothing but some embodiments of the disclosed front body structure for vehicle. Besides these embodiments, various changes and modifications may be made to the present invention without departing from the spirit and scope of the invention. For example, although the arm support member of the invention is illustrated by the suspension member 19, it may be replaced by a sub-frame on condition that a power unit is mounted on the sub-frame.

Japanese Patent Application No. 2001-349231 filed on Nov. 14, 2001, is expressly incorporated herein by reference in its entirety.

The scope of the invention is defined with reference to the following claims.

What is claimed is:

1. A front body structure for a vehicle, comprising:
    a pair of side members arranged on both sides of a front compartment of the vehicle to extend in a fore-and-aft direction of the vehicle;
    a front-end member connected to respective front ends of the side members so as to be laid across the side members;
    an extension side member arranged behind each of the side members in succession;
    a side sill arranged outside the extension side member in a width direction of the vehicle so as to extend substantially parallel to the extension side member;
    an outrigger connected to both a front end of the extension side member and a front end of the side sill;

a suspension arm attached to each of the side members through an arm support member;

a front wheel supported by the suspension arm and disposed between the outrigger and one outer end of the front-end member in the width direction of the vehicle; and a front-wheel movement promoting mechanism arranged between the front wheel and the arm support member, for promoting a backward movement of the front wheel, the backward movement being caused by a collision load acting on the front wheel while being accompanied with a backward deformation of the outer end of the front-end member, wherein the front-wheel movement promoting mechanism is disposed on the arm support member so as to promote a revolution movement of the front wheel in which a front end of the front wheel moves outwardly so that the front wheel abuts against the side sill.

2. The front body structure of claim 1, further comprising a guide mechanism arranged between the front wheel and the outer end of the front-end member, for controlling a timing of starting the backward movement of the front wheel when the collision load is exerted on the front wheel and further controlling an inclination of the front wheel in the steered direction when the collision load is exerted on the front wheel.

3. The front body structure of claim 1, wherein the front-wheel movement promoting mechanism is formed in the arm support member.

4. The front body structure of claim 1, wherein the front-wheel movement promoting mechanism is adapted so as to allow the front wheel moving backward due to the collision load to abut on the front end of the side sill.

5. The front body structure of claim 1, wherein the front-wheel movement promoting mechanism is adapted so as to allow the front wheel moving backward due to the collision load to abut in the vicinity of a connecting part of the outrigger with the side sill.

6. The front body structure of claim 1, wherein the suspension arm has a front arm and a rear arm which are attached to the arm support member, in which an attachment strength of the front arm is smaller than that of the rear arm.

7. A front body structure for a vehicle, comprising:

a pair of side members arranged on both sides of a front compartment of the vehicle to extend in a fore-and-aft direction of the vehicle;

a front-end member connected to respective front ends of the side members so as to be laid across the side members; an extension side member arranged behind each of the side members in succession;

a side sill arranged outside the extension side member in a width direction of the vehicle so as to extend substantially parallel to the extension side member;

an outrigger connected to both a front end of the extension side member and a front end of the side sill;

a suspension arm attached to each of the side members through an arm support member;

a front wheel supported by the suspension arm and disposed between the outrigger and one outer end of the front-end member in the width direction of the vehicle; and means for promoting a backward movement of the front wheel, which is caused by a collision load acting on the front wheel while being accompanied with a backward deformation of the outer end of the front-end member, the means being arranged between the front wheel and the arm support member, wherein the front-wheel backward movement promoting means is disposed on the arm support member so as to promote a revolution movement of the front wheel in which a front end of the front wheel moves outwardly so that the front wheel abuts against the side sill.

* * * * *